INVENTOR
MAX W. THOMPSON

BY Semmes and Semmes
ATTORNEYS

United States Patent Office 3,421,558
Patented Jan. 14, 1969

3,421,558
TREE FELLING SHEAR
Max Wood Thompson, Brandon, Miss., assignor to Future Products, Inc., Jackson, Miss., a corporation of Arkansas
Filed Jan. 3, 1968, Ser. No. 695,379
U.S. Cl. 144—34                                                9 Claims
Int. Cl. A01g 23/08

ABSTRACT OF THE DISCLOSURE

Method for tree felling, particularly a shear and gating apparatus pivoted to the front end of a mobile vehicle for cutting a tree trunk, then laterally displacing the severed trunk with respect to longitudinal axis of the vehicle.

BACKGROUND OF THE INVENTION

Field of the invention

Mobile tree felling devices have been widely developed with the goal of enabling felling and moving of trees by a single bulldozer operator. For the most part, such mobile devices have been spectacularly complex and expensive and none have had the combined capabilities of shearing the tree trunk and laterally displacing the tree trunk to one side of the vehicle after shearing. The capability of lateral displacement of the trunk after shearing is not remotely suggested in the prior art and uniquely enables the mobile vehicle to move freely in the cutting area.

Description of the prior art

The prior art teaches the employment of tractors or bulldozers together with pivotable shearing devices. Horncastle, 3,102,562, Bombardier 3,074,447, and Larson 3,238,981 utilize pivotable chain saw cutting devices.

The use of shearing knives together with tongs or grappling hooks, supporting the tree against the pressure of the shearing knives, is shown in Ingraham 2,612,194, Williams 3,340,912, and Ford, 2,748,813.

Busch 2,876,816; 2,981,301; 3,059,677; 3,196,911; and 3,269,437 teaches the utilization of hydraulic systems for operation of both the tongs and shearing knives.

SUMMARY OF THE INVENTION

According to applicant's method the tree being attacked is confined within a pivoted cutting frame. Simultaneously with shearing the tree trunk is rearwardly supported, then the severed trunk is laterally displaced from the shearing area. This method is carried out by pivoting a cutting frame at one end to a mobile vehicle. An axially reciprocating shear blade is positioned at the free end of the frame and a gate is pivoted laterally across the free end of the frame so as to be in axial alignment with the shear blade in gate closed position and so as to be laterally displaced with respect to said shear blade in gate open position. In gate closed position, the gate abuts the vertical tree trunk rear and supports the tree trunk against shearing action of the blade. As the tree is sheared by the blade cutting through its trunk, the severed tree trunk may be immediately discarded by pivoting the gate to open position, so as to laterally displace the severed tree with respect to the shearing blade and mobile vehicle. The shear, gate, and pivoting frame elements may be independently actuated by a plurality of hydraulic pistons controlled by a single system.

DESCRIPTION OF THE PREFERRED EMBODIMENTS

Figure 1:
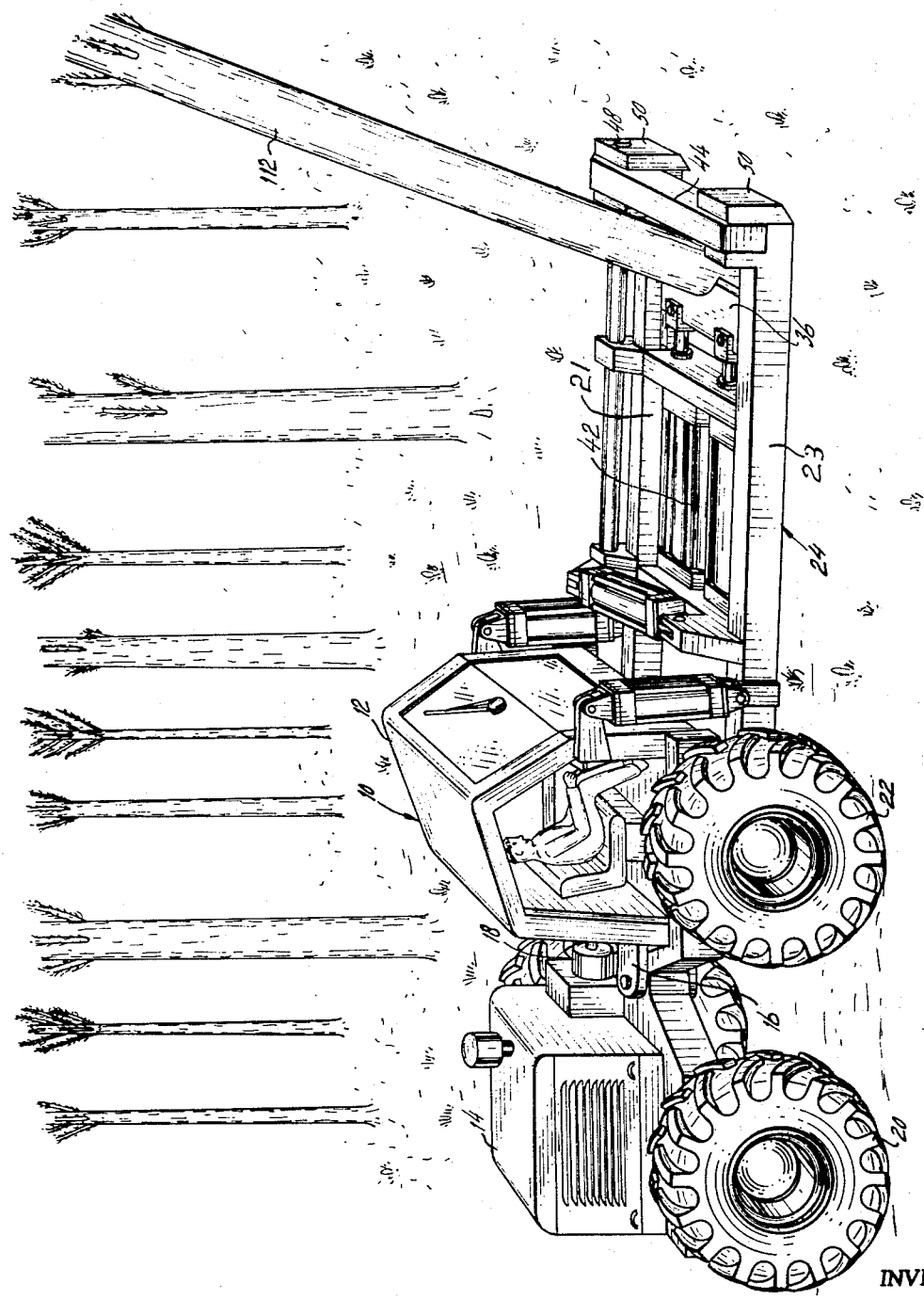
FIG. 1 is a perspective view of a shear-equipped mobile vehicle, and showing the shearing of a tree by blade 36, while the rear of the tree trunk 112 is abutted by gate 44.

In FIG. 1, mobile vehicle 10 is generally illustrated as comprising a cab section 12 and an engine section 14 pivoted to one another at 16 and articulated by means of hydraulic cylinder 18, the cab 12 and engine 14 components being supported, respectively, upon rear wheels 20 and front wheels 22.

Shear frame 24 is defined in part by laterally spaced parallel elongated booms 21, 23 pivoted to vehicle chassis 136 plate 26 by means of pin 30 extending through ears 28. At its open end, frame 24 encloses shearing blade 36 supported in clevis elements 38 by means of pins 40, each clevis 38 being attached to the end of an identical extensible piston rod 41 of a piston 42 secured to frame 24. Gate 44 is pivoted at one end thereof in the free end of boom 21 by means of pivoting bar 48 extending parallel to the longitudinal axes of booms 21, 23 and gate 44 is received at the opposite ends thereof in seats formed by vertical guide elements 50 on the free ends of booms 21 and 23. The gate may include an axial tree conforming concavity and pivoted end inclined shoulder (not illustrated). Gate 44 may include a lower trunk engaging support blade 138 secured by means of bolts 140.

Figure 2:
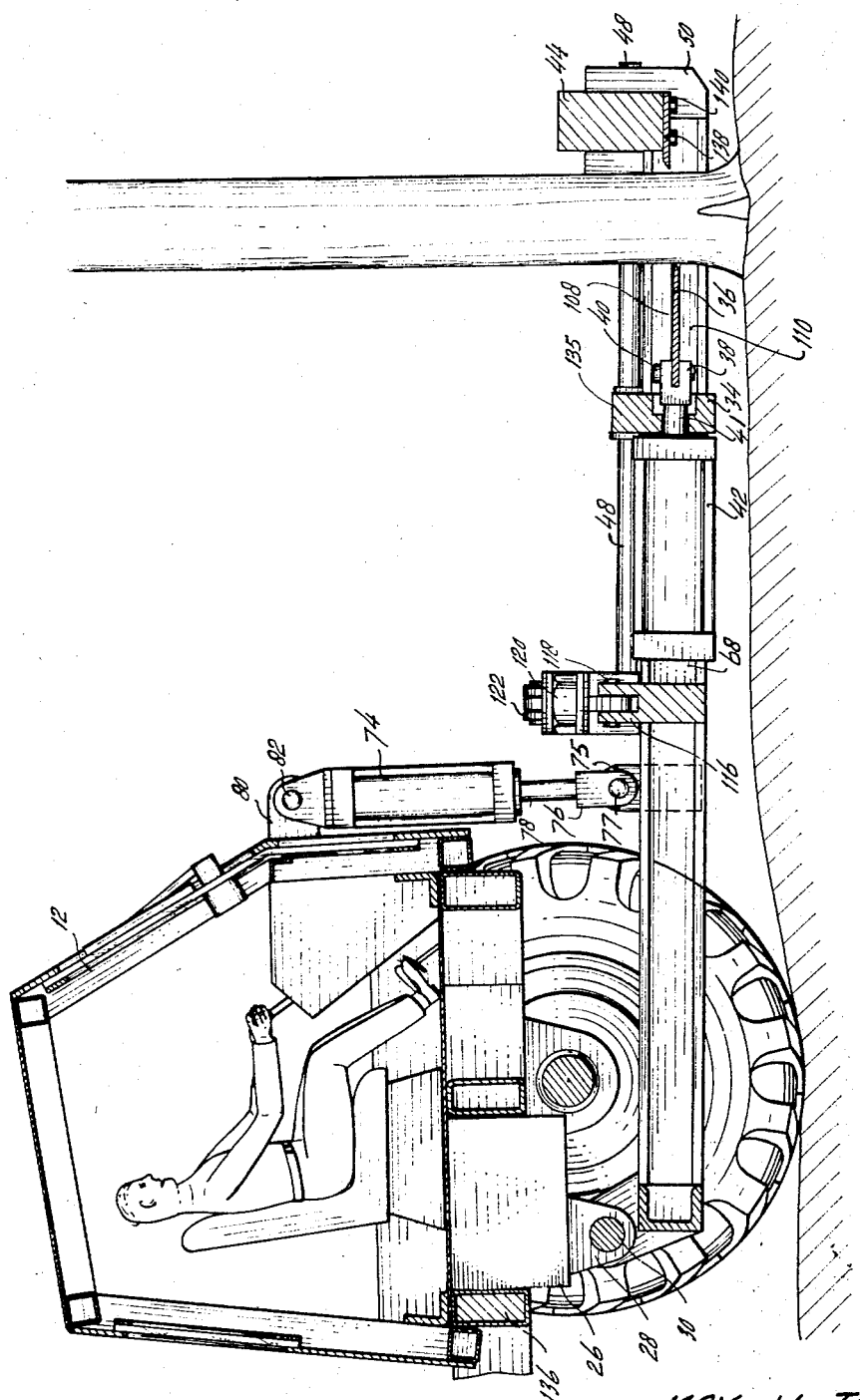
FIG. 2 is a fragmentary vertical section of the shear assembly pivoted to the under carriage of a mobile vehicle and showing the shear blade and closed gate just prior to shearing.
Figure 3:
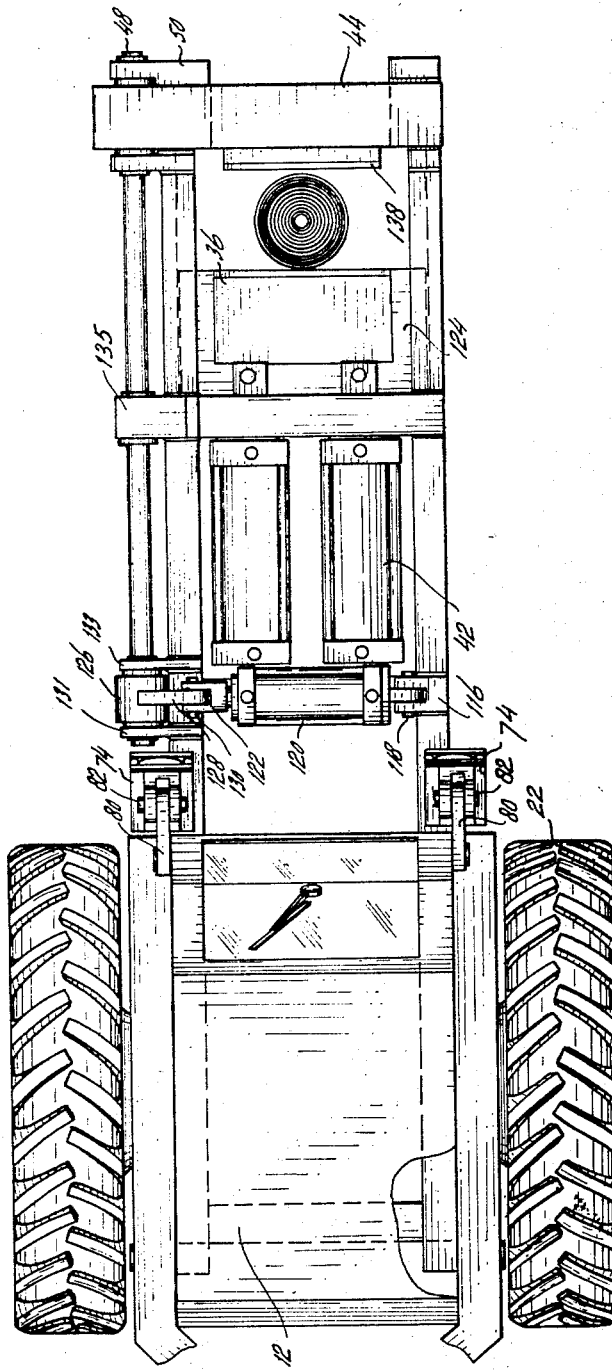
FIG. 3 is a top plan view of the vehicle shown in FIG. 2.

The frame pivoting mechanism includes a pair of identical pistons 74, each secured to the cab support ear 80 by means of pin 82 and each having extensible piston rod 78 with clevis assembly 76, engaging support ear 75 by means of pin 77. As piston 74 is actuated, the frame may be pivoted up and down, so as to engage the tree trunk at the lowest possible point. As will be apparent, the blade is only three or four inches above bottom plate 124, enabling cutting of the tree trunk three or four inches above ground and even lower than in the position illustrated in FIG. 2.

Figure 4:
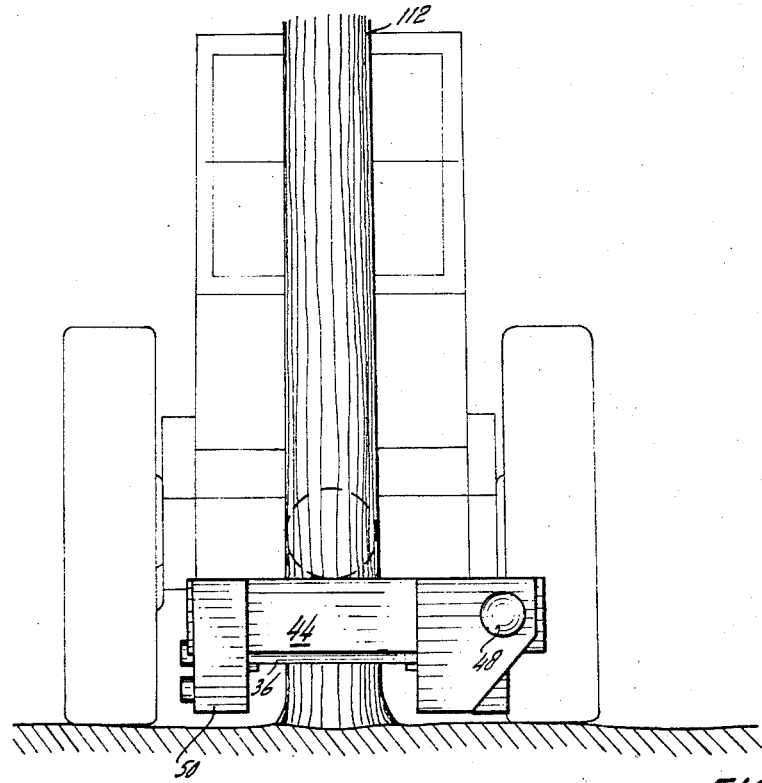
FIG. 4 is an enlarged front elevation of the gating and side cutter assembly, the gate being in gate closed position as in FIGS. 2 and 3.
Figure 5:
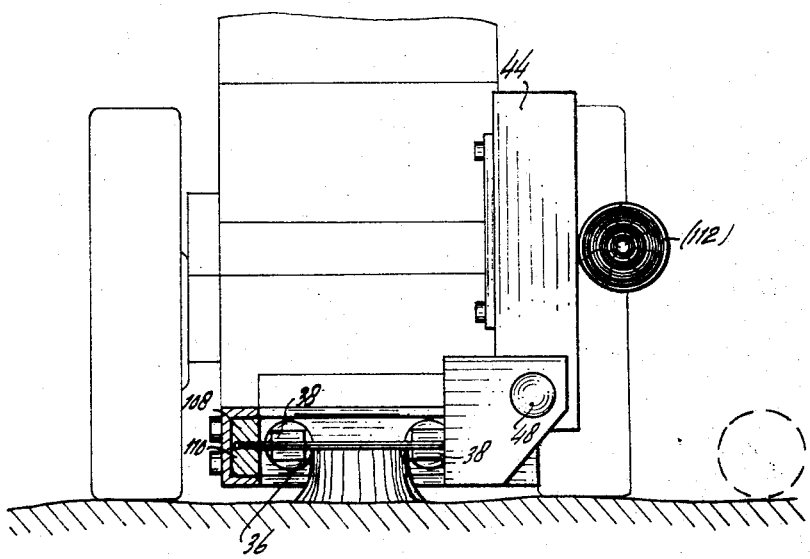
FIG. 5 is an identical front elevation of the gate and side cutter assembly, the gate being in gate open or lateral displacing position.

Gate 44 is illustrated in FIG. 4 in gate closed position during shearing, the horizontal position of the sheared tree being indicated in phantom, and in FIG. 8 in gate open position in lateral displacement of the sheared tree 112. Gate 44 is pivoted by means of piston 120 secured at one end to frame support piece 116 by means of pin 118 and its other end terminating in clevis assembly 122, engaging fin 128 secured to gate turning or pivoting rod 48, mounted rotatably by bushing in frame side elements 131, 133 and 135 and the vertical guides 50. Blade guides 108 and 110 may support blade 36 side edges during shearing.

As will be apparent, the method and suggested apparatus enables shearing and lateral displacement, of a sheared trunk to a place of cutting or stacking. Also, the sheared trunk may be lifted and pulled by pivoting frame 24 upwardly, then driving the vehicle rearwardly. Conventionally, separate vehicles are required to be used for the cutting, lateral displacing and moving functions. The gate uniquely enables a lateral displacement of a severed trunk away from the line of action of the vehicle.

Manifestly, various changes in shearing and gating elements may be employed without departing from the spirit of the invention.

I claim:
1. In combination with a vehicle, a tree felling shear comprising:
 (a) a frame comprising a pair of laterally spaced parallel elongated booms each pivoted at one end thereof to said vehicle;
 (b) an end gate pivotably mounted at one end thereof adjacent the free end of one of said booms and received at the opposite end thereof in a seat formed adjacent the free end of the other of said booms, the pivot axis of said end gate being parallel to the longitudinal axis of said booming;
 (c) a tree engaging shear blade mounted upon the frame for horizontal movement toward said end gate so as to be advanceable through a tree trunk encompassed by said booms, said end gate and said shear blade;
 (d) said end gate when in closed position with the free end thereof seated in said frame providing a back up for the rear of a tree trunk during advancing of said shear blade; and
 (e) said end gate when pivoted from said closed position to an open position with the free end thereof unseated from said frame providing a means for engaging a sheared tree trunk and lifting said tree to one side of said frame.

2. The combination of claim 1, including independent hydraulic piston actuating means interconnecting said frame to said vehicle, said shear to said frame, and said gate to said frame.

3. The combination of claim 2, said hydraulic piston actuating means including at least one shear pivoting hydraulic piston pivoted to said vehicle at its upper end and extending via piston rod to engage a mid portion of said frame.

4. The combination of claim 3, including a pair of shear pivoting hydraulic pistons pivoted to said vehicle at their upper ends and extending via individual piston rods to engage opposed sides of a mid portion of said frame.

5. The combination of claim 4, including at least one shear blade reciprocating piston secured at one end to said frame and its other end engaging via piston rod and clevis a portion of said shear blade.

6. The combination of claim 5, including shear blade horizontal guides mounted in said frame, so as to overlap side portions of said shear blade.

7. The combination of claim 6, said end gate being attached at frame end to a pivoting bar rotatably mounted in a side of said frame and a gate pivoting hydraulic piston, secured transversely of said frame, crank engaging said pivoting bar.

8. The combination of claim 7, said end gate including a tree-engaging blade extending across said frame and horizontally towards said shear blade, so as to engage the rear of a tree being attacked by said shear blade within the confines of said frame.

9. The combination of claim 8, said end gate being transversely supported by a pair of vertical guides defined at either side of said frame.

References Cited
UNITED STATES PATENTS

| | | | |
|---|---|---|---|
| 2,612,194 | 9/1952 | Ingraham et al. | 144—34 |
| 3,074,447 | 1/1963 | Bombardier | 144—3 |
| 3,294,131 | 12/1966 | Larson | 144—34 |

FRANCIS S. HUSAR, *Primary Examiner.*

U.S. Cl. X.R.

144—309